US012367334B2

(12) United States Patent
Save et al.

(10) Patent No.: US 12,367,334 B2
(45) Date of Patent: Jul. 22, 2025

(54) RUNTIME AND MEMORY EFFICIENT ATTRIBUTE QUERY HANDLING FOR DISTRIBUTED ENGINE

(71) Applicant: Synopsys, Inc., Mountain View, CA (US)

(72) Inventors: Yogesh Dilip Save, Mumbai (IN); Kirti Kedia, Mumbai (IN); Ajit Sequeira, Bengaluru (IN); Abhishek Nandi, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 679 days.

(21) Appl. No.: 17/711,371

(22) Filed: Apr. 1, 2022

(65) Prior Publication Data

US 2022/0318481 A1 Oct. 6, 2022

Related U.S. Application Data

(60) Provisional application No. 63/169,337, filed on Apr. 1, 2021.

(51) Int. Cl.
*G06F 30/398* (2020.01)
*G06F 30/392* (2020.01)

(52) U.S. Cl.
CPC .......... *G06F 30/398* (2020.01); *G06F 30/392* (2020.01)

(58) Field of Classification Search
CPC ......... G06F 16/955; G06F 2009/45591; G06F 2009/45595; G06F 7/58; G06F 7/588; G06F 8/71; G06F 9/455; G06F 9/45545; G06F 9/4555; G06F 9/45558; G06F 9/4881; G06F 16/9566; G06F 16/9574; G06F 16/958; G06F 21/57; G06F 11/3485; G06F 16/24568; G06F 16/951; G06F 9/4401; G06F 9/4405; G06F 9/4408; G06F 1/3209; G06F 1/3243; G06F 1/3275; G06F 1/329; G06F 1/3296; G06F 12/0207; G06F 12/0284; G06F 12/109; G06F 16/221; G06F 16/2456; G06F 16/254; G06F 16/9024; G06F 16/9038; G06F 16/9535; G06F 16/9537; G06F 18/23211; G06F 21/602; G06F 21/6227; G06F 21/78; G06F 2111/02; G06F 2212/1041; G06F 2212/154; G06F 2212/656; G06F 2212/657; G06F 30/3315; G06F 30/392; G06F 30/398; G06F 9/465; G06F 9/545; G06F 30/30; G06F 30/27; G06F 21/45; G06F 16/903; G06F 30/327; G06F 3/14; G06F 9/5083; G06F 9/52;

(Continued)

(56) References Cited

U.S. PATENT DOCUMENTS

| 2014/0055880 A1* | 2/2014 | Jhatakia | G11B 27/36 360/48 |
|---|---|---|---|
| 2020/0349161 A1* | 11/2020 | Siddiqui | G06N 20/10 |
| 2020/0364223 A1* | 11/2020 | Pal | G06F 16/24539 |

* cited by examiner

*Primary Examiner* — Binh C Tat
(74) *Attorney, Agent, or Firm* — Lowenstein Sandler LLP

(57) ABSTRACT

A method, a system, and a non-transitory computer readable medium are provided. The method includes performing, by one or more computing devices, a lookahead scan of a file of a circuit design to extract information associated with a query in an iterative loop, performing an action to retrieve attribute information from one or more partitions of the circuit design before executing the iterative loop, and querying the iterative loop using the stored attribute information. The action stores the attribute information based on the extracted information.

20 Claims, 16 Drawing Sheets

(58) Field of Classification Search
CPC . G06F 16/3344; G06F 16/3334; G06N 20/00;
G06N 3/08; G06N 3/045; G06N 3/092
USPC .................................................. 716/108–115
See application file for complete search history.

900

| Obj Collection | |
|---|---|
| 0 | Obj 1 |
| 1 | Obj 2 |
| 2 | Obj 3 |
| 3 | Obj 4 |
| 4 | Obj 5 |
| 5 | Obj 6 |
| 6 | Obj 7 |
| 7 | Obj 8 |
| 8 | Obj 9 |
| 9 | Obj 10 |
| ⋮ | ⋮ |
| N | Obj N |
| 1 | Obj 1 |
| 2 | Obj 2 |
| 3 | Obj 3 |
| 4 | Obj 4 |
| 5 | Obj 5 |
| 6 | Obj 6 |
| 7 | Obj 7 |
| 8 | Obj 8 |
| 9 | Obj 9 |
| 10 | Obj 10 |
| ⋮ | ⋮ |
| M | Obj M |

→ Key1111
→ Key1121
⋮
→ Key11T1

→ Key1211
→ Key1221
⋮
→ Key12T1

Key$_{ijkm}$ → i = partition Number
j = attribute (index)
k = collection (index)
m = chunk of objects in kth collection

FIG. 9

RUNTIME AND MEMORY EFFICIENT ATTRIBUTE QUERY HANDLING FOR DISTRIBUTED ENGINE

CROSS-REFERENCE TO RELATED APPLICATIONS

The present application claims the benefit under 35 U.S.C. § 119(e) of U.S. Provisional Patent Application No. 63/169,337 filed on Apr. 1, 2021, which is incorporated herein by reference in its entirety for all purposes.

TECHNICAL FIELD

The present disclosure relates generally to an electronic design automation (EDA) system. In particular, the present disclosure relates to a system and method for providing runtime and memory efficient attribute query handling for a distributed engine.

BACKGROUND

Static timing analysis (STA) is one of the steps in very large-scale integration (VLSI) design flow as without final signoff with STA, no chip is taped-out. With increasing complexity and size of integrated circuits, performing STA on the design with a single machine is difficult as it is time consuming. It may also be hard to perform STA with a single machine as the design may not fit into a single machine. Most of the approaches that try to solve this issue are based on micro-modeling (e.g., analysis using extracted timing model (ETM), interface logic model (ILM)) which may result into a loss of accuracy.

SUMMARY

In one aspect, the method includes performing, by one or more computing devices, a lookahead scan of a file of a circuit design to extract information associated with a query in an iterative loop, performing an action to retrieve attribute information from one or more partitions of the circuit design before executing the iterative loop, and querying the iterative loop using the stored attribute information. The action stores the attribute information based on the extracted information.

In one aspect, a system includes a memory storing instructions, and a processor, coupled with the memory and to execute the instructions. The instructions when executed cause the processor to perform a lookahead scan of a file of a circuit design to extract information associated with a query in an iterative loop, perform an action to retrieve attribute information from one or more partitions of the circuit design before executing the iterative loop, wherein the action stores attribute information based on the extracted information, and query the iterative loop using the stored attribute information.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 9 is a schematic that illustrates a storage server, in accordance with an embodiment of the present disclosure.

DETAILED DESCRIPTION

Figure 1A:
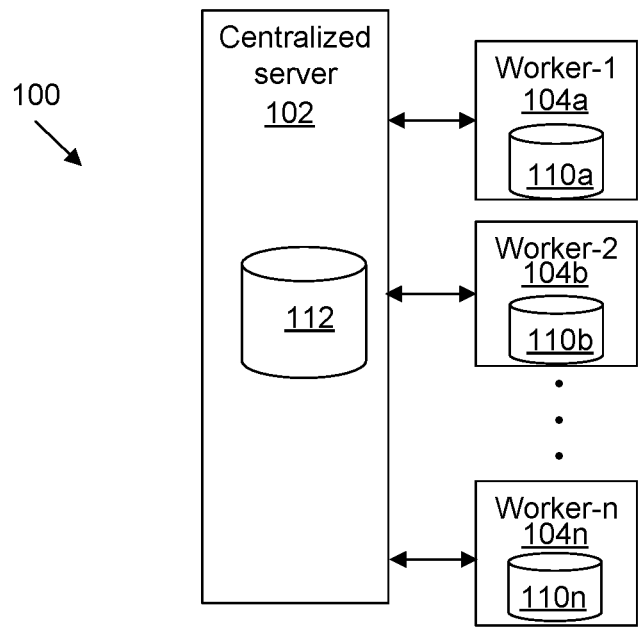
FIGS. 1A and 1B are schematics that illustrate a distributed architecture using a centralized server, in accordance with an embodiment of the present disclosure.

Aspects of the present disclosure relate to query handling for a distributed engine. The query may include attribute data query, attribute query, or analyzed data query.

In another class of approaches to perform STA analysis for complex integrated circuits, the design is divided into multiple pieces and is solved using multiple machines without loss of accuracy. This class of approaches helps to keep turn-around time acceptable. In addition, this class of approaches may be used for very large size designs because it is scalable.

Distributed static timing analysis (DSTA) may be used in handling very large-scale integration (VLSI) designs. Distributed infrastructure (e.g., distributed systems shown in FIG. 2A and FIG. 2B) may suffer from problems when handling an attribute query in an iterative loop (e.g., a command that is used to iterate over each element present in a collection of objects such as foreach_in_collection). For example, querying attribute data in the iterative loop is very slow when the number of the queries is too large. This is because, for each attribute query, a primary machine (i.e., a central machine responsible for controlling distributed machines) requests attribute information from multiple partitions (i.e., distributed machines responsible for actual computations). Each partition of the multiple partitions computes an attribute value and sends the attribute value to the primary machine. In this approach, the setup time to establish communication is larger as compared to actual attribute query.

One approach is to use a change in a user script by gathering required attributes in one shot by introducing additional commands. For example, the data may be written on a disk and the attribute data may be parsed during attribute queries (e.g., using report attribute command). This approach involves manual effort, and in most cases, customers are not ready to change their scripts.

Embodiments disclosed herein solve the problems of unfeasibility of handling a large number of attribute queries in the iterative loop with the distributed infrastructure. In some aspects, a look-ahead scan of a part of a user script is performed to speed up attribute query. With the look-ahead scan, the required data information is gathered. The gathered data information allows extraction of attribute data in chunks that results in a faster attribute query.

In some embodiments, a common storage server (intelligent storage mechanism, storage mechanism) may be implemented to avoid memory overhead at the partitions. The common storage server can be shared across different processes as the memory required is temporary (i.e., only used during attribute iteration loop). Further, the storage server does not impact the memory of the primary machine (i.e., master, central processor). Also, the storage server is designed such that there are less data fetch operations during an attribute query.

Advantages of the present disclosure include, but are not limited to, controlling peak memory increase at the primary machine and decreasing the number of fetch operations resulting in an improved run-time. In addition, it is expected to get almost equal or better runtime for attribute query as compared to flat (i.e., single machine, non-distributed) flow when using the approaches described herein. There is a minimal or no change in the user script with the distributed architecture. In addition, there is minimal or no impact on the memory of the primary machine. Thus, attribute queries in iterative loops and implicit iterative attribute queries such as sorting/filtering of a collection of objects based on an attribute value are handled efficiently in DSTA.

For performing DSTA, various distributed architectures are used. There are two distributed architectures broadly used for STA (shown in FIG. 1 and FIG. 2). Each distributed architecture has its own pros and cons as discussed below.

Figure 1B:
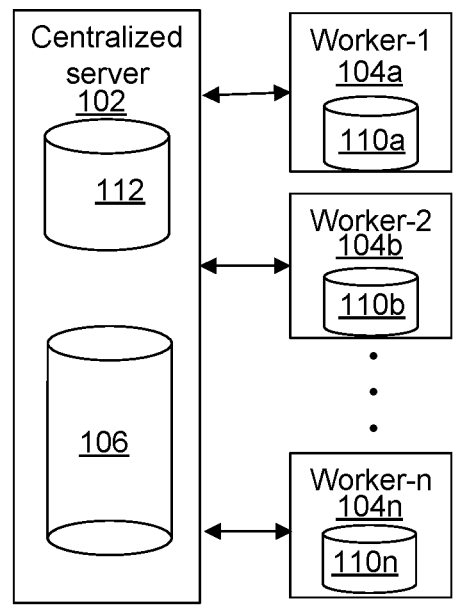

FIGS. 1A and 1B are schematics that illustrate a distributed architecture 100 using a centralized server (or master) 102, in accordance with an embodiment of the present disclosure. The distributed architecture 100 may include centralized server 102 and a plurality of distributed processors (or workers) 104. The plurality of distributed processors 104 may include N-worker machines (e.g., 104a, 104b, . . . , 104n). In distributed architecture 100, the analysis is done by plurality of distributed processors 104. After the analysis is completed, the data is aggregated and stored in a data store 106 in centralized server 102, as illustrated in FIG. 1B. Distributed processors 104 may store other data (e.g., netlist, constraint information, and the like) in a data store 110 (e.g., 110a, 110b, 110n) associated with each distributed processor of the plurality of distributed processors 104. Centralized server 102 may also include a data store 112 that includes design information (e.g., a netlist, constraint information, and the like).

Distributed architecture 100 provides the advantage of having timing reports in centralized server 102 (e.g., in data store 106) without accessing distributed processors 104 during an iterative loop. In addition, distributed processors 104 can be released after the analysis is completed. A disadvantage of distributed architecture 100 is that centralized server 102 may require a large memory. Thus, distributed architecture 100 may not be suitable for solving large designs, as the architecture is not scalable.

Figure 2A:
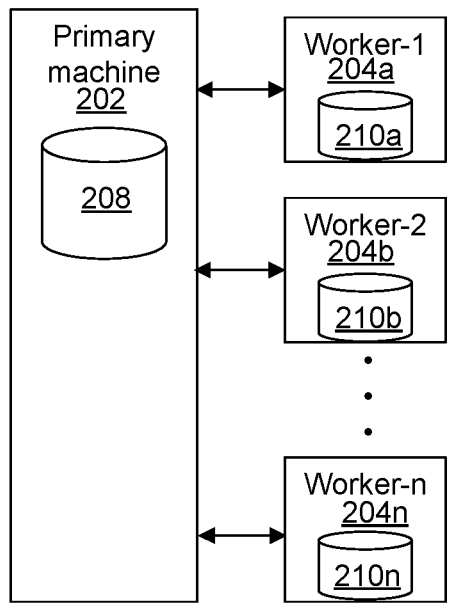
FIGS. 2A and 2B are schematics that illustrate another distributed architecture using distributed machines, in accordance with an embodiment of the present disclosure.
Figure 2B:
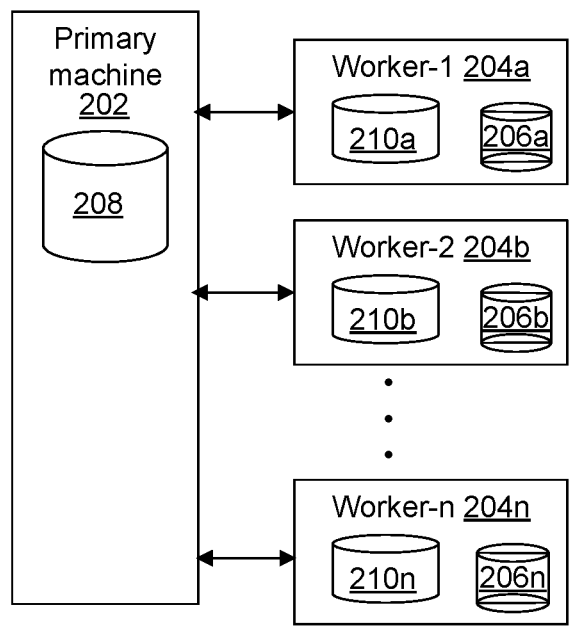

FIGS. 2A and 2B are schematics that illustrate another distributed architecture 200 using distributed machines 204 (or worker machines), in accordance with an embodiment of the present disclosure. The STA may be handled by a primary machine 202 and a plurality of distributed machines 204 such as N-worker machines (e.g., 204a, 204b, . . . , 204n) for N-partitions. The number of worker machines (thus the number of partitions) may be based on user specifications, computing resource availability, or the like as would be understood by one of ordinary skill in the art.

Primary machine 202 is flexible (i.e., can be configured to handle multiple tasks including multiple distributed machines). In one implementation, primary machine 202 may be lightweight (i.e., low memory requirement). In other implementations, primary machine 202 can store enough information to locally perform basic STA reporting commands. Once partitioning is done, STA can be performed in parallel on distributed machines 204 with minimal communication between distributed machines 204. The analyzed data/results are kept across distributed machines 204 instead of performing aggregation after the analysis. For example, the analyzed data may be stored in a data source 206 associated with each distributed machine as shown in FIG. 2B (e.g., 206a, 206b, . . . , 206n). For example, a data source 206a may be associated with distributed machine 204a. Primary machine 202 may include a design database 208. Each distributed machine of the plurality of distributed machines 204 may also include a design database 210 (e.g., 210a, 210b, . . . 210n). For example, distributed machine 204a may include a design database 210a. Design databases 208 and 210 may store netlist, constraint information, and the like.

In some embodiments, primary machine 202 may retrieve data from distributed machines 204 when a request or a query is received from a user (e.g., a request to retrieve timing data). Results can be obtained separately from each distributed machine of the plurality of distributed machines 204.

Figure 3:
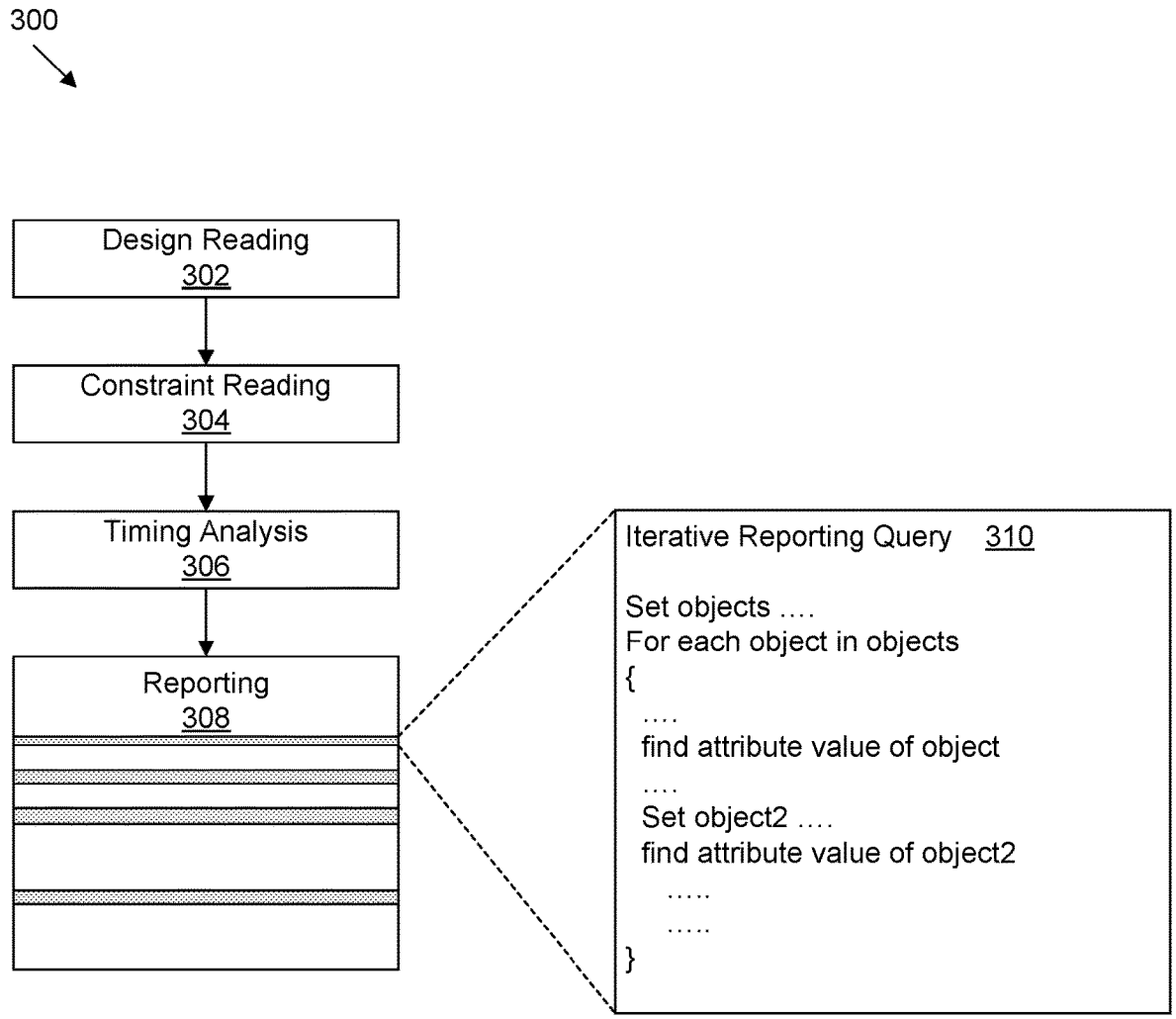
FIG. 3 illustrates a flowchart for a static timing analysis (STA) flow, in accordance with an embodiment of the present disclosure.

FIG. 3 illustrates a flowchart for a static timing analysis (STA) flow 300, in accordance with an embodiment of the present disclosure. At 302, design data of a circuit design is read. For example, design data may be read in the form of a hardware description language (HDL) (e.g., Verilog or very high-speed integrated circuit hardware description language (VHDL) files). At 304, logical and physical constraints (e.g., desired performance requirements) are applied. At 306, timing analysis is performed to find expected timing of the design without actual simulation. For example, a clock timing signal or a data signal is propagated through the circuit design. Arrival times of the signal at each node is measured to determine a delay at each node throughout the circuit design. Arrival times and delay may be compared with times specified in the logical and physical constraints. After the timing analysis is completed, it may be desired to evaluate the result of the timing analysis. At 308, various reporting commands are executed to check the results. In some embodiments, it is desired to check the results for each object (e.g., a design object). This is generally performed using iterative loops (e.g., iterative reporting query 310). Design objects may include logic gates, subsystem blocks, system blocks, and the like. For example, the user may query timing data of one or more objects of the design.

In some embodiments, an iterative reporting query 310 may handle a collection of objects. In iterative reporting query 310, an attribute value may be required for an iterator of an object (e.g., foreach_in_collection). Iterative attribute queries may include sorting and/or filtering the collection of objects based on the attribute value. The object may be an element of the circuit design. For example, the object may include a port, a net, a cell, and the like. The attribute may be a string or a value associated with the object that carries some information about the object. The attribute may include worst slack, worst slack edge, maximum delay, a number of path, and the like.

The approaches described herein speed up such reporting queries in the iterative loop for the distributed STA. While executing a script for reporting whenever iterative loops are identified, one or more additional actions are performed, before executing queries inside the loops.

Figure 4:
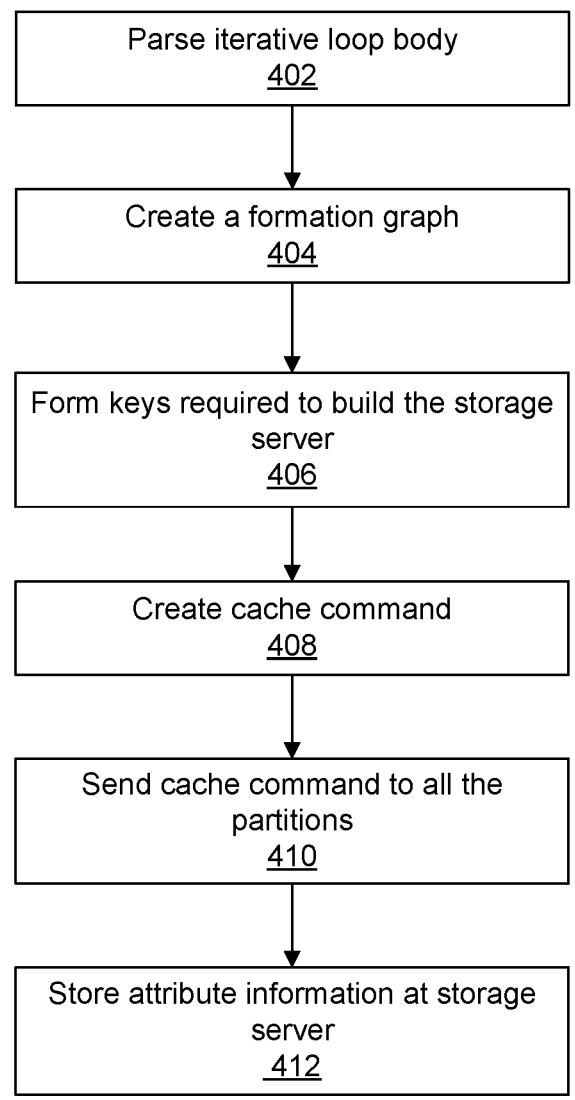
FIG. 4 illustrates a flowchart for actions to be executed before executing an iterative loop, in accordance with an embodiment of the present disclosure.

FIG. 4 illustrates a flowchart 400 of actions (commands) to be executed before executing an iterative loop, in accordance with an embodiment of the present disclosure. At 402, a look-ahead scan is performed. During the look-ahead scan, a body of the iterative loop is parsed. For example, iterative reporting query 310 of FIG. 3 is parsed. The information about objects that are used or needed by the attribute query are identified. For example, objects that are dependent from another object may be identified.

At 404, a formation graph is created. The formation graph may represent a relationship between an attribute and one or more objects. The formation graph is used to identify the information to be cached for the attributed query. The formation graph is further described in relation to FIG. 5.

At 406, keys that are used to build the storage server are formed. The keys may be used to retrieve data from a storage server as described further below. The storage server is further described in relation to FIG. 6. The storage server may sequentially store the attribute information.

At 408, a cache command is created by the primary machine. At 410, the primary machine may send the cache command to all the distributed machines (e.g., partitions). Each distributed machine of the plurality of distributed machines may send attribute information to the storage server. The attribute information to be sent to the storage server are determined based on the cache command. At 412, attribute information is stored in the storage server.

Once steps 402-412 are performed, actual execution of the iterative loop may be started.

Figure 5:
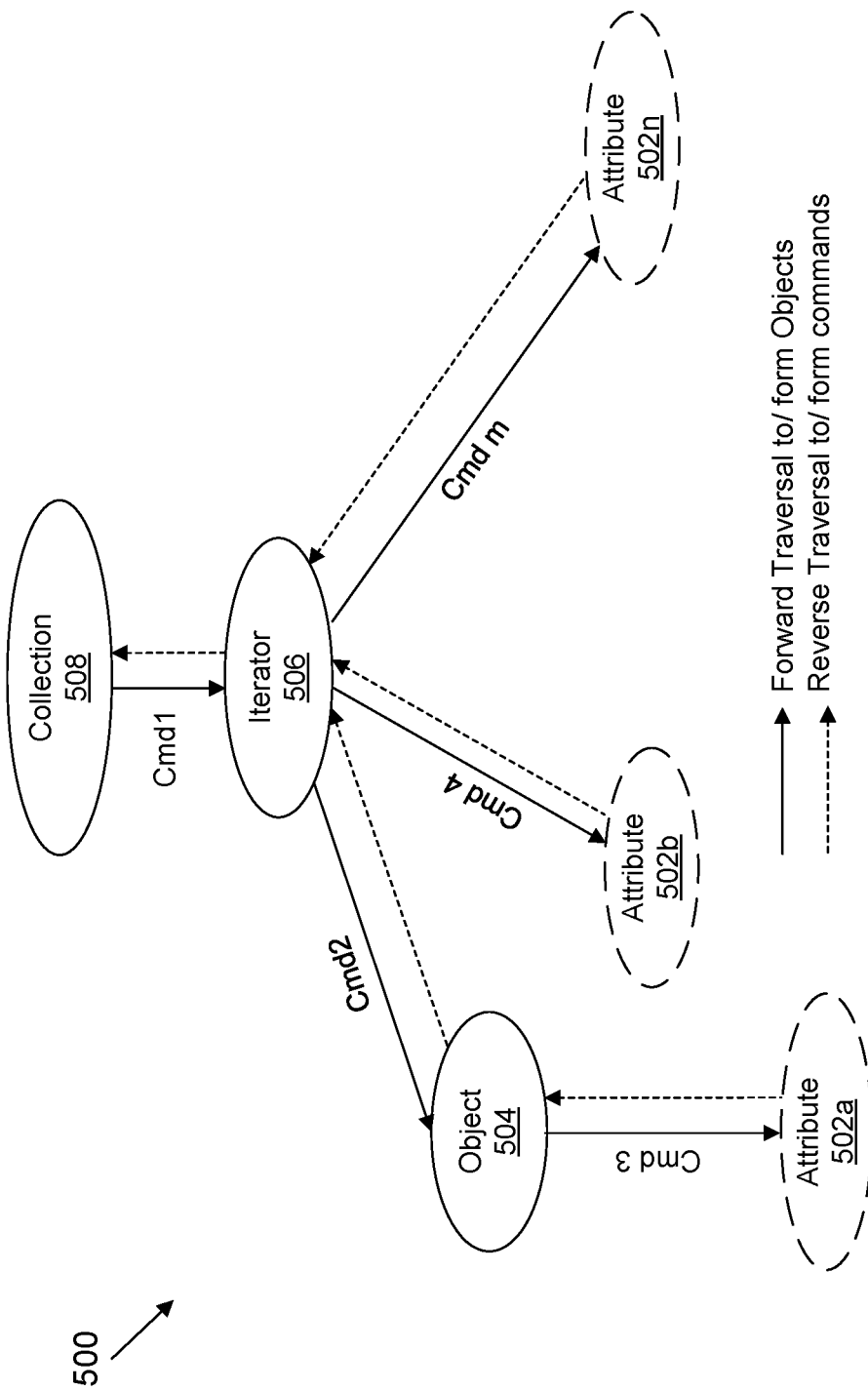
FIG. 5 is a schematic that illustrates a cache command formation graph, in accordance with an embodiment of the present disclosure.

FIG. 5 illustrates a cache command formation graph 500, in accordance with an embodiment of the present disclosure. In some embodiments, a look-ahead scan of the user script with modifying functionality of iterative commands such as foreach_in_collection is performed. The following operations and steps are performed during the look-ahead scan.

The content of an iterative loop (e.g., body of each foreach_in_collection query 310 of FIG. 3) is parsed to extract all the relevant information used for the attribute query (represented as a forward traversal from the object in graph 500). The relevant information may include the objects and/or attributes used in the query. Then, attributes 502 (e.g., attribute 502a, attribute 502b, and attribute 502n) for which data is desired from partitions are identified using the parsed information. Objects for which attribute data is desired are identified using the parsed information (e.g., object 504, iterator 506, and collection 508). A collection may refer to a collection of objects. The collection may include a collection of cells, a collection of timing paths, a collection of pins, and the like. An iterator may be an element in the collection. In some aspects, a single object may be an iterator of an object collection. In graph 500, object 504 is a dependent variable on iterator 506. In graph 500, "cmd" is an operator that operates on objects and results in objects of different or same type. Attribute 502a is related to object 503 (cmd3) and object 504 is dependent on iterator 506 (cmd2). Based on this relation and operators (cmd), the objects for which attribute 502a is used are found. Similarly, iterator 506, attribute 502b, and attribute 502n are used. Solid lines in FIG. 5 represent relations/operator using cmd. It goes top to bottom (starts from a root node to leaf nodes with intermediate nodes) and generates objects dependent on previous objects (parent node in the graph 500). The dotted lines in FIG. 5 starts from a leaf node that contains attribute information. It represents attribute object relationship that helps to find out the information for objects which attribute information is required.

With the objects and the attributes, using a reverse graph traversal (indicated by dotted lines in FIG. 5), cache commands are formed to get all the relevant attribute data from used object from the partitions. That is, commands that retrieve the values of the relevant attributes for the objects that are used in the query are formed.

In some embodiments, desired information (information that is returned by the query) is retrieved (i.e., gathered) in one command as the objects and corresponding attribute information are available before the actual query is executed. Thus, the setup time required for communication (between the machines) is negligible.

Figure 6:
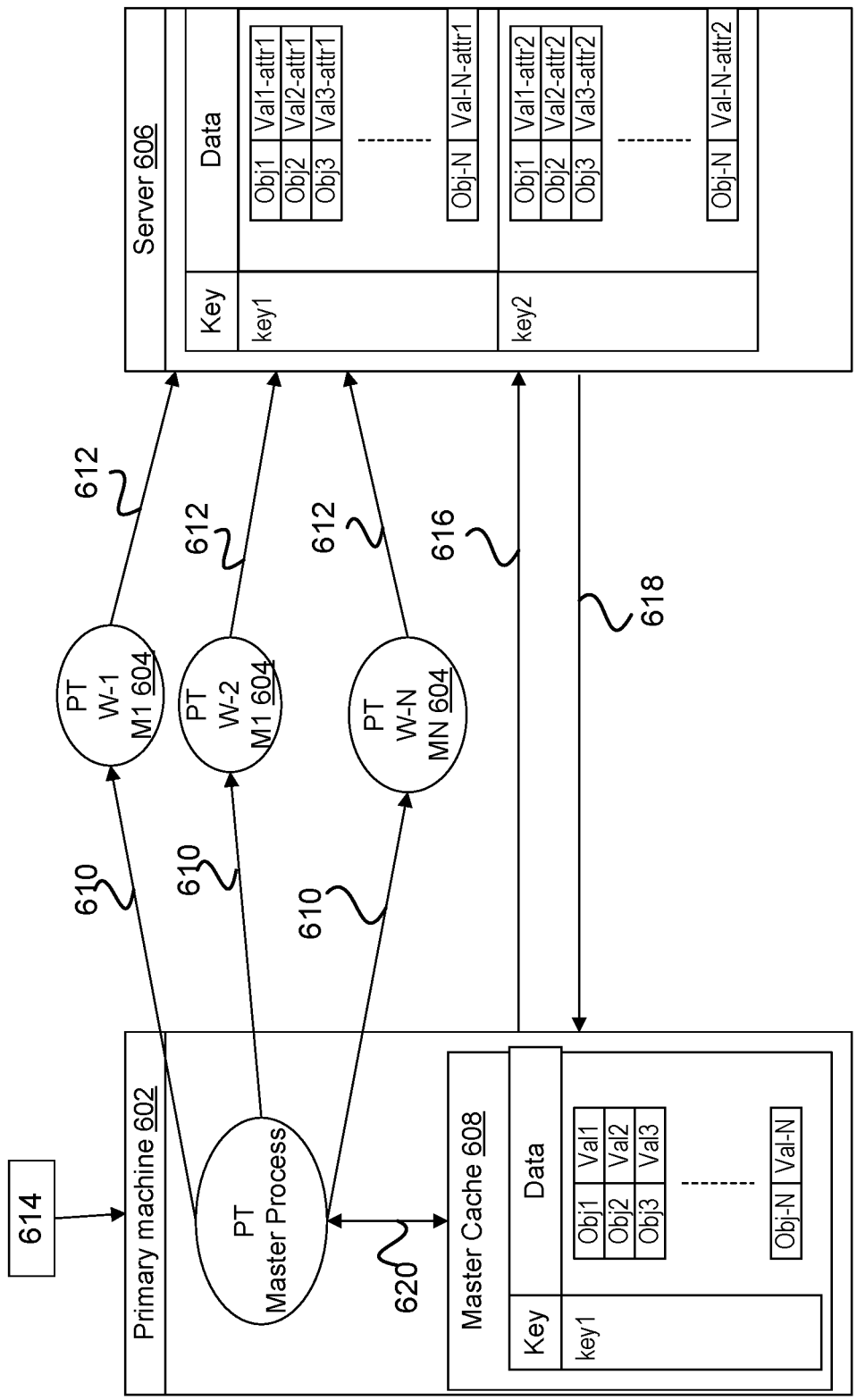
FIG. 6 is a schematic that illustrates a workflow for attribute query handling, in accordance with an embodiment of the present disclosure.

FIG. 6 illustrates a workflow for attribute query handling, in accordance with an embodiment of the present disclosure. In some embodiments, a primary machine 602 may prepare a cache command 610 using relevant information corresponding to the attributes being queried on objects. Cache command 610 can be sent to all the partitions 604. Partitions 604 process the objects and calculate an attribute value for each object present in the partition.

In some embodiments, data is sent to a processor of primary machine 602 while gathering attribute data as the data may be used during an actual iteration. However, the memory requirement of primary machine 602 may greatly increase if the complete data is sent to primary machine 602. Similarly, memory requirement of partitions is increased if the gathered data is kept in the partitions itself (e.g., partition 604). A big memory size machine is reserved during the entire run, though the data is only used during an iteration. In some embodiments, partitions 604 may send the data to a storage server 606 in the form of a key as described later herein and shown in FIG. 9.

In some embodiments, storage server 606 may be shared across multiple runs as each run uses temporary storage space. Storage server 606 can be a cloud storage based key-data model as no complex operations are performed. That is, the storage server 606 may not perform STA or other operations that are relatively process demanding.

In some aspects, partitions 604 may simultaneously send the data 612 to storage server 606. The data 612 may correspond to the data associated with the cache command 610. The data 612 may include attribute and object data. Storage server 606 may send an acknowledgment back to partitions 604 when the data 612 is received by storage server 606. Then, partitions 604 may inform primary machine 602 that the attribute data is available in storage server 606. Primary machine 602 can start querying the attribute value. When a function 614 to retrieve a value of an attribute on the object (e.g., get attribute) is received by primary machine 602, primary machine 602 can request a chunk of data 616 corresponding to a key from storage server 606. Data 618 received from storage server 606 can be stored in a cache 608 of primary machine 602. Primary machine 602 can communicate 620 with cache 608 to get attribute information. In some embodiments, cache 608 is deleted after some iterations.

Figure 7:
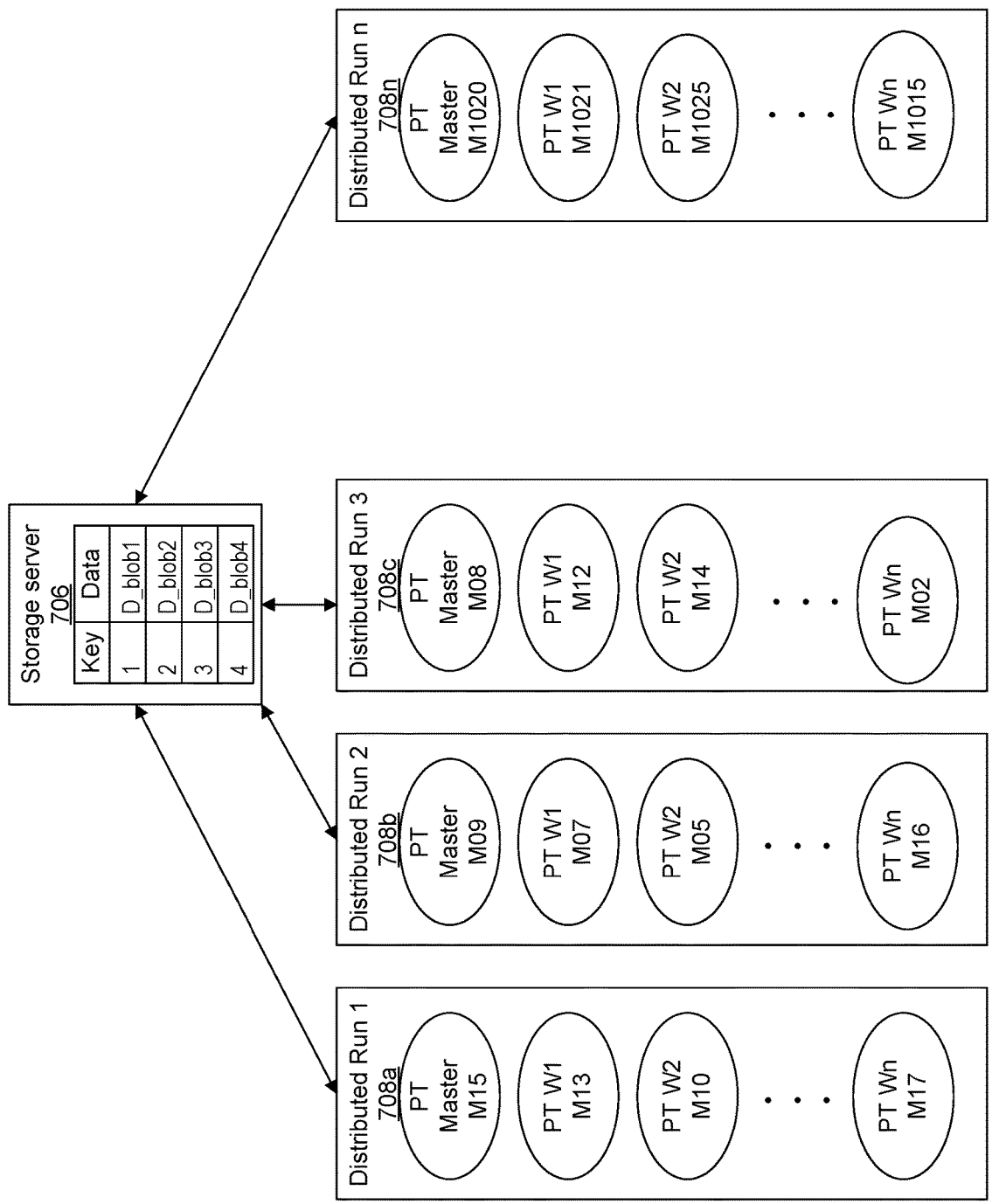
FIG. 7 is a schematic that illustrates a storage server, in accordance with an embodiment of the present disclosure.

FIG. 7 is a schematic that illustrates a storage server 706, in accordance with an embodiment of the present disclosure. Storage server 706 can be shared by multiple distributed runs. The distributed runs may include a first distributed run 708*a*, a second distributed run 708*b*, a third distributed run 708*c*, . . . , and a $n^{th}$ distributed run 708*n*. Each distributed run may include a primary machine and one or more worker machines. Storage server 706 may store information from first distributed run 708*a*, second distributed run 708*b*, third distributed run 708*c*, . . . , and $n^{th}$ distributed run 708*n*. For example, as described previously herein, each primary machine for a distributed run may send a cache command to the worker machines. In turn, the worker machine may send the information to the storage server 706. Thus, the peak memory of the primary machine may not increase because the data is sent to storage server 706.

In some embodiments, a worker machine may connect to storage server 706 via a network connection. The network connection may be a wired connection (e.g. Ethernet), a wireless connection (e.g. 802.11 Wi-Fi or Bluetooth™), or other appropriate networking technology. Storage server 706 may include any number of storage devices (e.g., storage disks, storage shares, NFS shares, and exports).

Figure 8A:
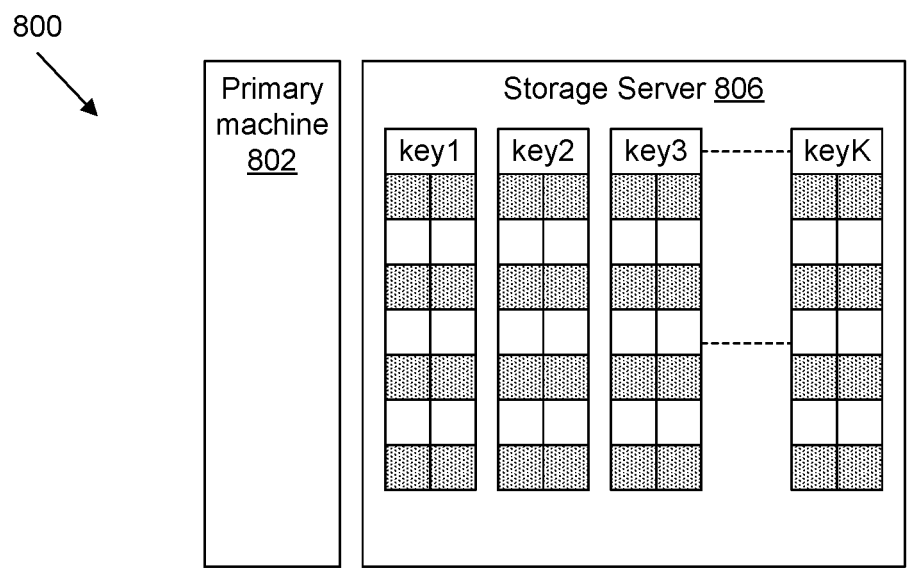
FIGS. 8A-8C are schematics that illustrate a storage server, in accordance with an embodiment of the present disclosure.
Figure 8B:
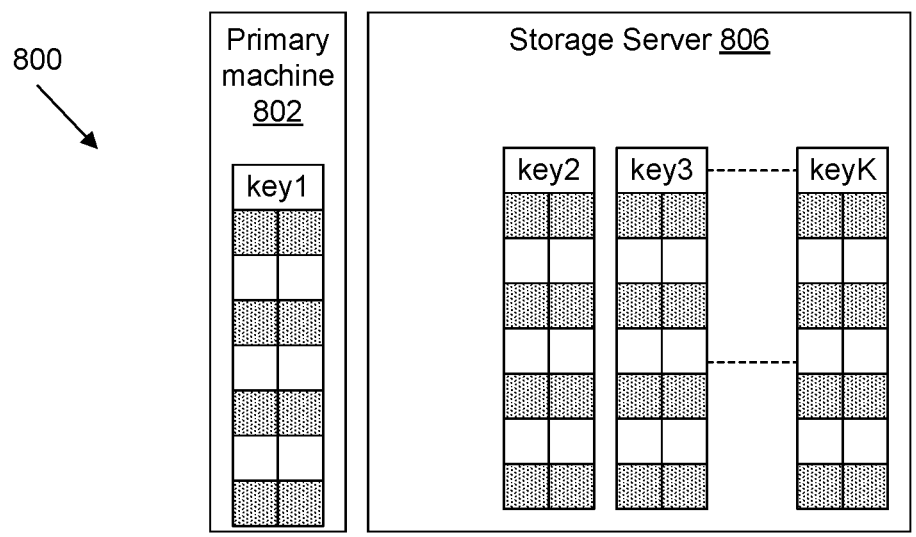
Figure 8C:
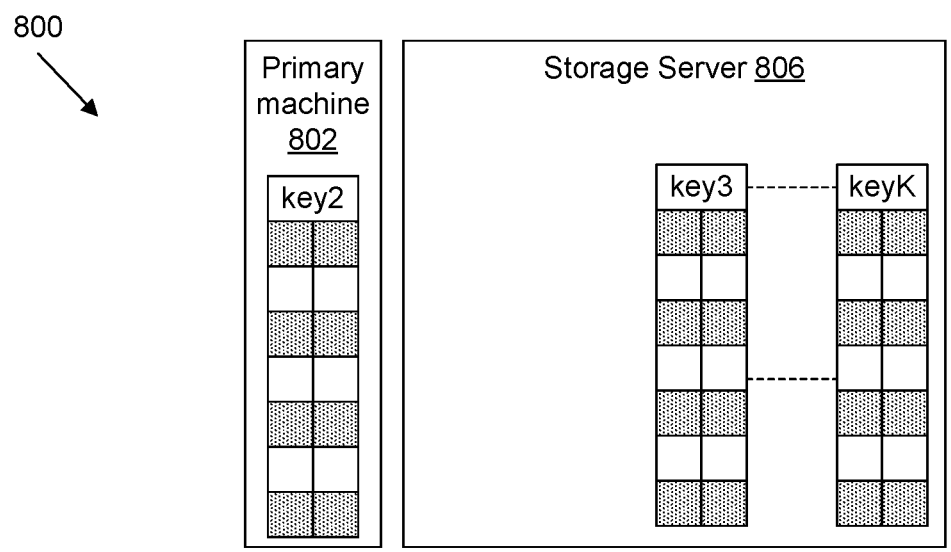

FIGS. 8A-8C are schematics that illustrate a storage server 800, in accordance with an embodiment of the present disclosure.

In some embodiments, an iterative loop may include a collection of n-objects. The iterative loop may call for a single attribute data. In one example, the data may reside in a single partition. The collection of n-objects may be divided into "k" chunks (sections) (also referred to as a dividing factor herein). For each chunk, a unique key is created. Attribute data is cached for the objects in the chunk as shown in FIG. 8A. For example, after receiving the cache command from a primary machine, each partition may send the unique key to a storage server 806.

During an iteration for a first attribute query (corresponding to a first object), attribute data corresponding to a first key are moved to primary machine 802 and deleted from storage server 806 as shown in FIG. 8B. For subsequent (n/k−1) object attribute queries, the attribute data is already in primary machine 802 so there is no need to fetch the data from storage server 806 as shown in FIG. 8B.

For $(n/k+1)^{th}$ object, attribute are fetched from storage server 806. Thus, attribute data corresponding to the first key is deleted from primary machine 802 and the attribute data corresponding to the second key is moved to primary machine 802. Attribute data corresponding to the second key are deleted from storage server 806 as shown in FIG. 8C. The process is repeated for all data attribute associated with all keys.

The unique key used in FIGS. 8A-8C is generated considering the index of the object only. However, in an iterative loop, multiple collections of objects use multiple attribute data and the data may reside in multiple partitions. Thus, the key may be a combination of partition number, attribute index, collection index, chunk (of a collection) index as described further below.

FIG. 9 is a schematic that illustrates a storage server 900, in accordance with an embodiment of the present disclosure. As described previously herein, using keys to store and retrieve attribute data from a storage server does not increase the peak memory of the primary machine. In addition, the attribute data are stored in the storage server using storage server 900 such as the number of fetch operations from the server is minimized. The attribute data are stored such as it is sequentially accessible.

The attribute data is stored based on the key in the storage server (e.g., storage server 606 of FIG. 6). The size of data stored depends on the way each key is generated for a group of objects. As discussed previously herein, the information (i.e., attribute data) can be gathered with the help of the look-ahead scan. For example, the total number of objects and the number of attributes for which data is required can be gathered. With this information, the memory requirement can be estimated to hold attribute data during the entire iteration. Depending on available/allowed memory (e.g., difference between peak and used memory), objects are divided into several sections. For each section, a key is assigned. The key in storage server 900 may be a combination of a partition number (i), an attribute index or name (j), an index of the collection (k), and a collection itself (i.e., chunk of objects in kth collection). FIG. 9 shows two sets of keys. In some aspects, there may be "n" sets of keys. In the first set of keys, there are T keys. The collection index changes from 1 to T. In the second set of keys, the second attribute information is cached. Both keys represent data corresponding to chunk 1 having different attribute information.

In some embodiments, whenever the data is not available in the primary machine, it is fetched from the storage server. The grouping of objects is such as a way that there may be a minimal number of fetch operations, and each fetch brings an appropriate size of attribute data. Because the look-ahead scan was performed, the complete sequence of object query for each attribute is known. Thus, each key is formed in the same way as an iteration of objects inside the iterative loop (e.g., foreach_in_collection). On-the-fly key generation provides the advantages of controlling peak memory increase at the primary machine and decreasing the number of fetch operation resulting in an improved run-time. In one example, a first query may fetch data associated with object one through object five. Thus, once the next query is received during the iterative loop, the data is already available in the cache of the primary machine and no additional data is fetched from the storage server.

In some embodiments, dividing factor k can be used to control the size of the cache of the primary machine. The smaller the dividing factor means a greater number of objects per key. Thus, a smaller dividing factor results in a bigger cache size requirement. The dividing factor may be selected by the user.

Figure 10:
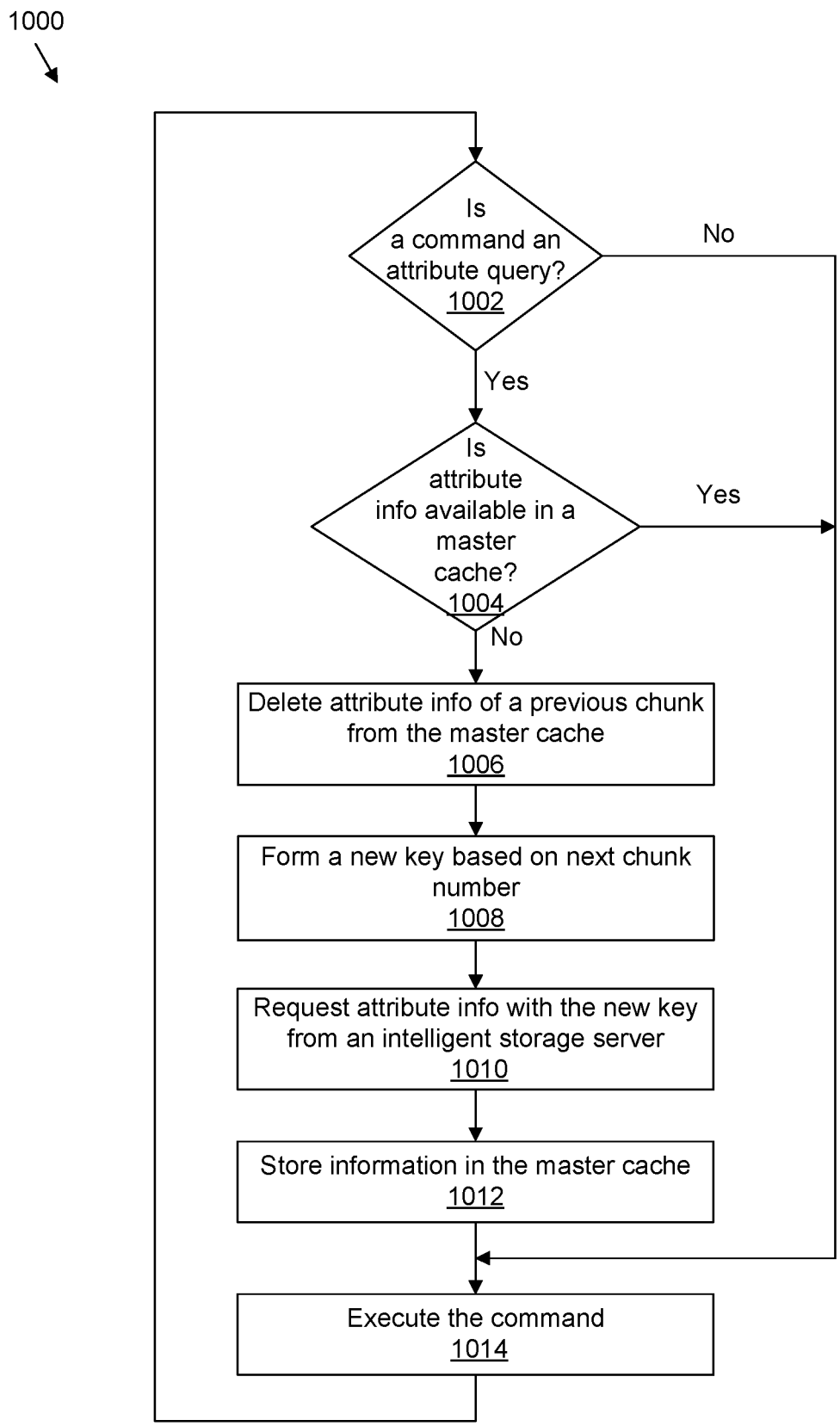
FIG. 10 illustrates a flowchart for a method for executing the iterative loop, in accordance with an embodiment of the present disclosure.

FIG. 10 illustrates a flowchart for a method 1000 for executing the iterative loop, in accordance with an embodiment of the present disclosure. Method 1000 shows a single command execution in the iterative loop. At 1002, a determination is made as to whether the command is an attribute query. In response to determining that the command is an attribute query, the process proceeds to step 1004. In response to determining that the command is not an attribute query the process proceeds to step 1014.

At 1004, a determination is made as to whether the attribute information is available in the cache of the primary machine. The determination may be based on an availability of the key of the data in the cache of the primary machine. In response to determining that the attribute information is available, the process proceeds to step 1014. In response to determining that the attribute information is not available, the process proceeds to step 1006. At 1006, the attribute information of a previous chunk is deleted from the cache of the primary machine (e.g., primary machine 602). At 1008, a new key based on a next chunk number is formed. At 1010, attribute information is requested using the new key (formed at 1008) from a storage server (e.g., storage server 606). At 1012, the information is stored in the cache of the primary machine. At 1014, a command is executed.

The storage server described herein minimizes the number of additional actions for attributes queries. Thus, the determination at step 1004 results in a "yes" more often than a "no." That is, the attribute information is more likely to be available in the cache of the primary machine when using the storage server described herein.

Figure 11:
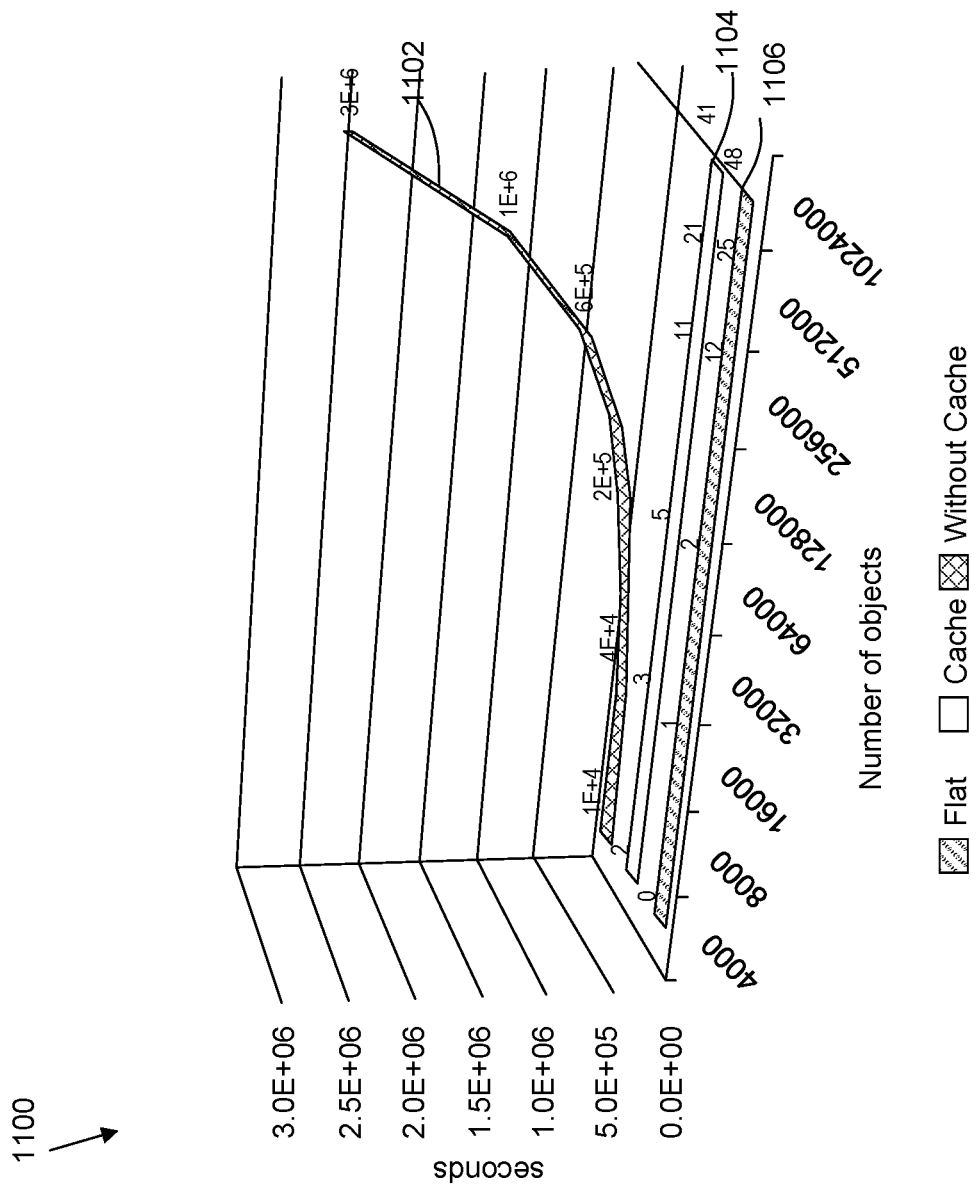
FIGS. 11-13 illustrate exemplary results, in accordance with an embodiment of the present disclosure.

FIG. 11 is a schematic 1100 that shows a runtime comparison between flat and DSTA (with and without the methods described herein) in accordance with an embodiment of the present disclosure. In schematic 1100, the x-axis corresponds to a number of objects and the y-axis corresponds to the runtime in seconds. The results are shown for four attributes. Curve 1102 shows the runtime for DSTA without cache. Curve 1104 shows the runtime for DSTA with cache as described in this disclosure. Curve 1106 shows the runtime for a flat (i.e., single machine solution).

Without using the method described herein, the run-time required to execute an iterative attribute query is polynomial with respect to the number of objects as shown by curve 1102. Using the method described herein, the run-time is linear with the number of objects as shown by curve 1104. Also, the run-time is comparable with flat as shown by curve 1106. For a significantly larger number of objects, the method described herein provides an improved runtime over the flat. As shown in FIG. 11, it may not be possible to execute larger attribute queries in iterative loop for the distributed solution without using the approaches described herein.

Figure 12:
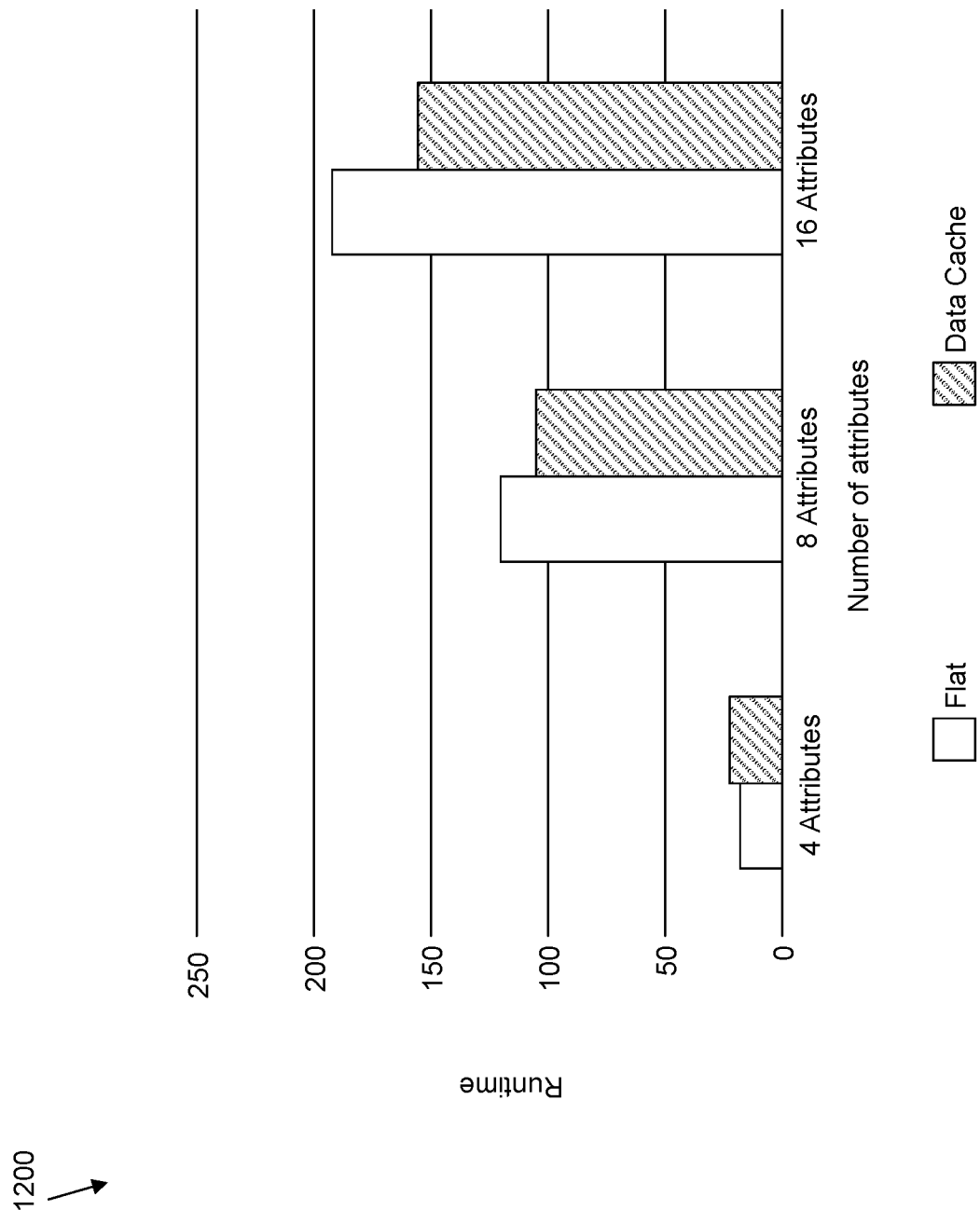

FIG. 12 is a schematic that shows a runtime comparison between flat and DSTA with cache for a different number of attributes. The number of objects in the example shown is 32,610,751. FIG. 12 shows that the method disclosed herein has a better performance compared to flat when the number of attributes is large (e.g., 8 attributes or 16 attributes in this example). In addition, the size of the cache used to store the data increases with an increase in the number of attributes.

Figure 13:
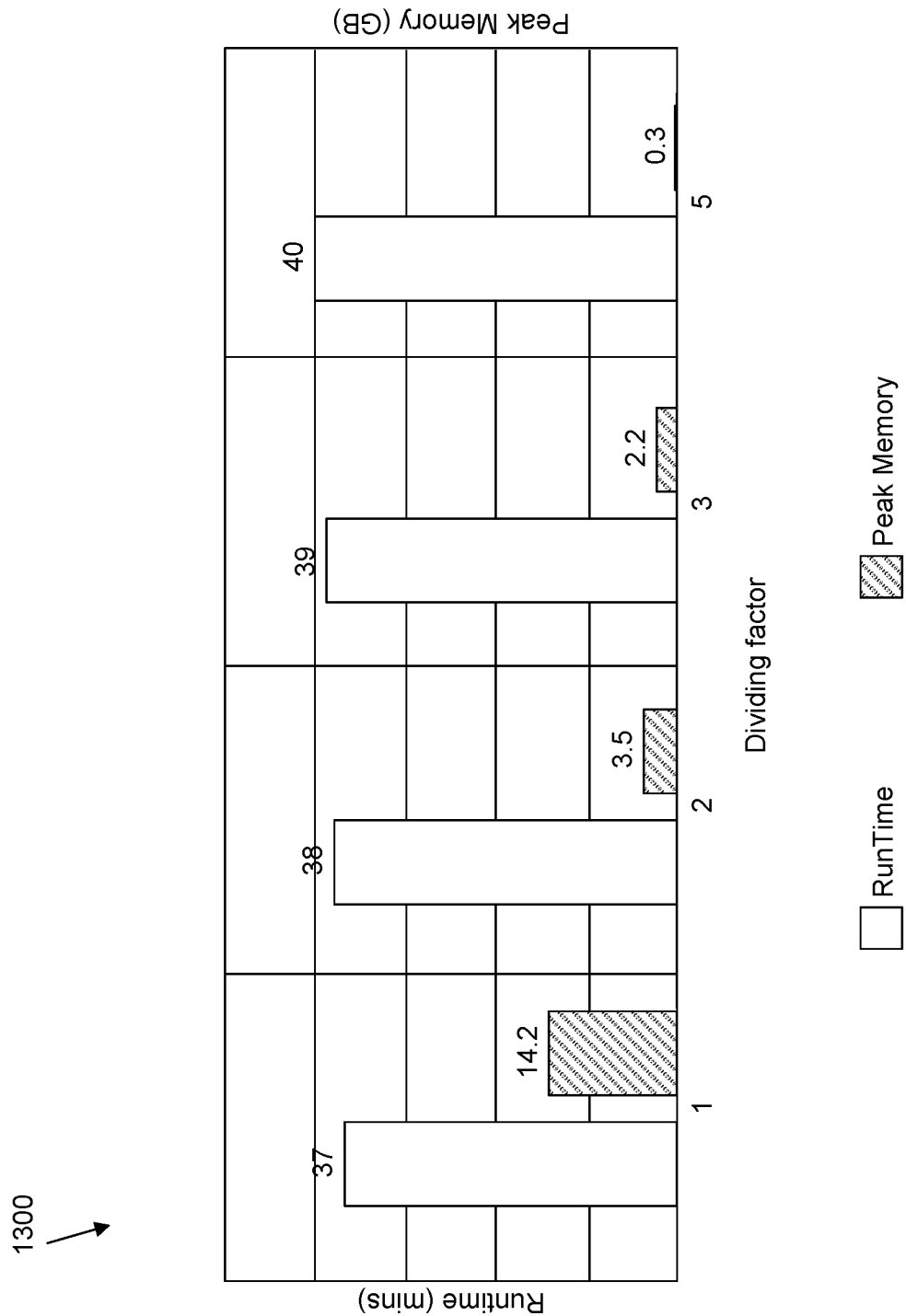

FIG. 13 is a schematic that shows the runtime and the peak memory for different dividing factors (k). With designing an appropriate key, the memory usage can be controlled with negligible effect on runtime. As described previously herein a larger dividing factor has the advantage of using less peak memory. For example, a dividing factor of five may use 0.3 GB of memory compared to 14.2 GB for a dividing factor of one. The effect on runtime is negligible. The runtime for a dividing factor of five is 40 minutes while the runtime for a dividing factor of one is 37 minutes. The k factor may be selected on-the-fly based on the available memory buffer in the primary machine (master machine).

Figure 14:
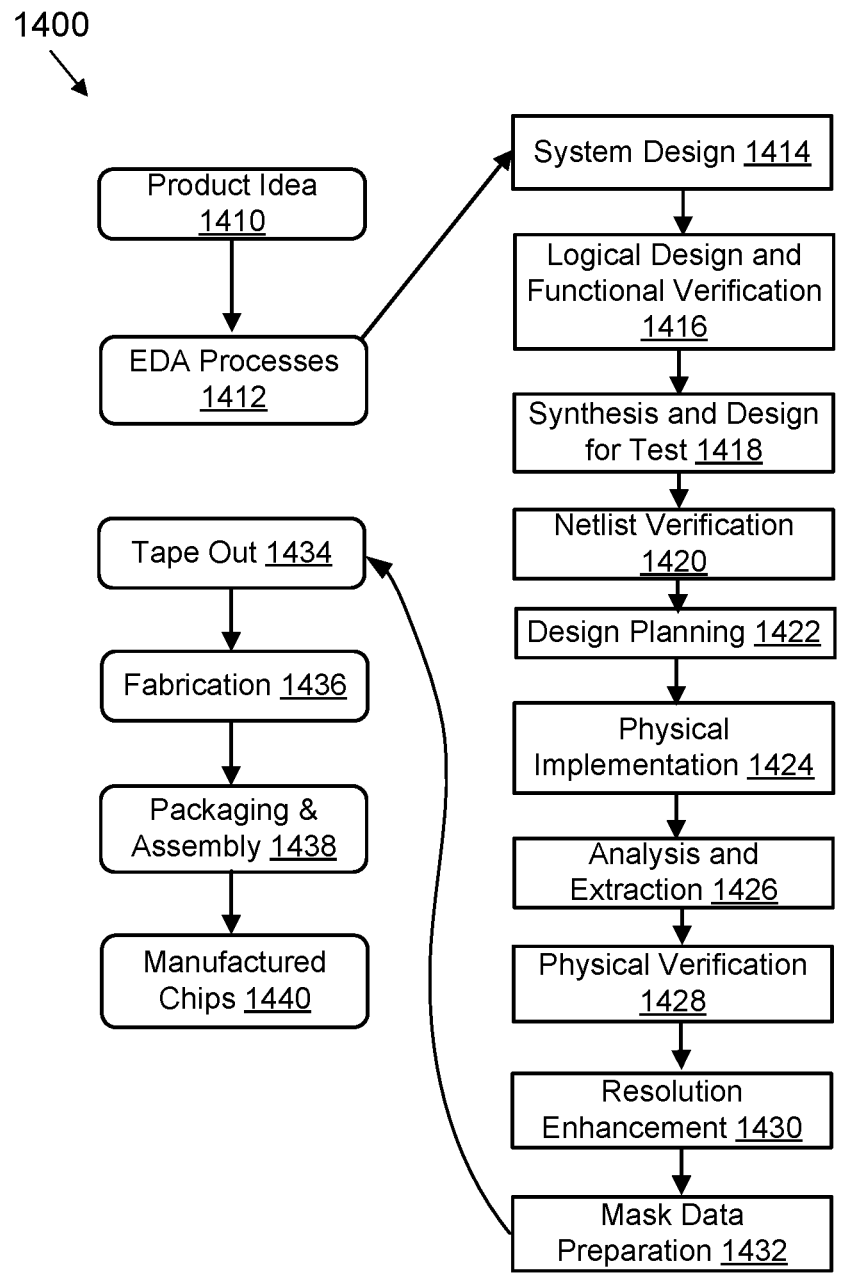
FIG. 14 depicts a flowchart of various processes used during the design and manufacture of an integrated circuit, in accordance with some embodiments of the present disclosure.

FIG. 14 illustrates an example set of processes 1400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1410 with information supplied by a designer, information which is transformed to create an article of manufacture that uses a set of EDA processes 1412. When the design is finalized, the design is taped-out 1434, which is when artwork (e.g., geometric patterns) for the integrated circuit is sent to a fabrication facility to manufacture the mask set, which is then used to manufacture the integrated circuit. After tape-out, a semiconductor die is fabricated 1436 and packaging and assembly processes 1438 are performed to produce the finished integrated circuit 1440.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 14. The processes described may be enabled by EDA products (or tools).

During system design 1414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1420, the netlist is checked for compliance with timing constraints and for correspondence with the HDL code. During design planning 1422, an overall floor plan for the integrated circuit is constructed and analyzed for timing and top-level routing. The approaches described herein may be implemented in 1420.

During layout or physical implementation 1424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1426, the circuit function is verified at the layout level, which permits refinement of the layout design. During physical verification 1428, the layout design is checked to ensure that manufacturing constraints are correct, such as DRC constraints, electrical constraints, lithographic constraints, and that circuitry function matches the HDL design specification. During resolution enhancement 1430, the geometry of the layout is transformed to improve how the circuit design is manufactured.

During tape-out, data is created to be used (after lithographic enhancements are applied if appropriate) for production of lithography masks. During mask data preparation 1432, the 'tape-out' data is used to produce lithography masks that are used to produce finished integrated circuits.

A storage subsystem of a computer system (such as computer system 1500 of FIG. 15) may be used to store the programs and data structures that are used by some or all of the EDA products described herein, and products used for development of cells for the library and for physical and logical design that use the library.

Figure 15:
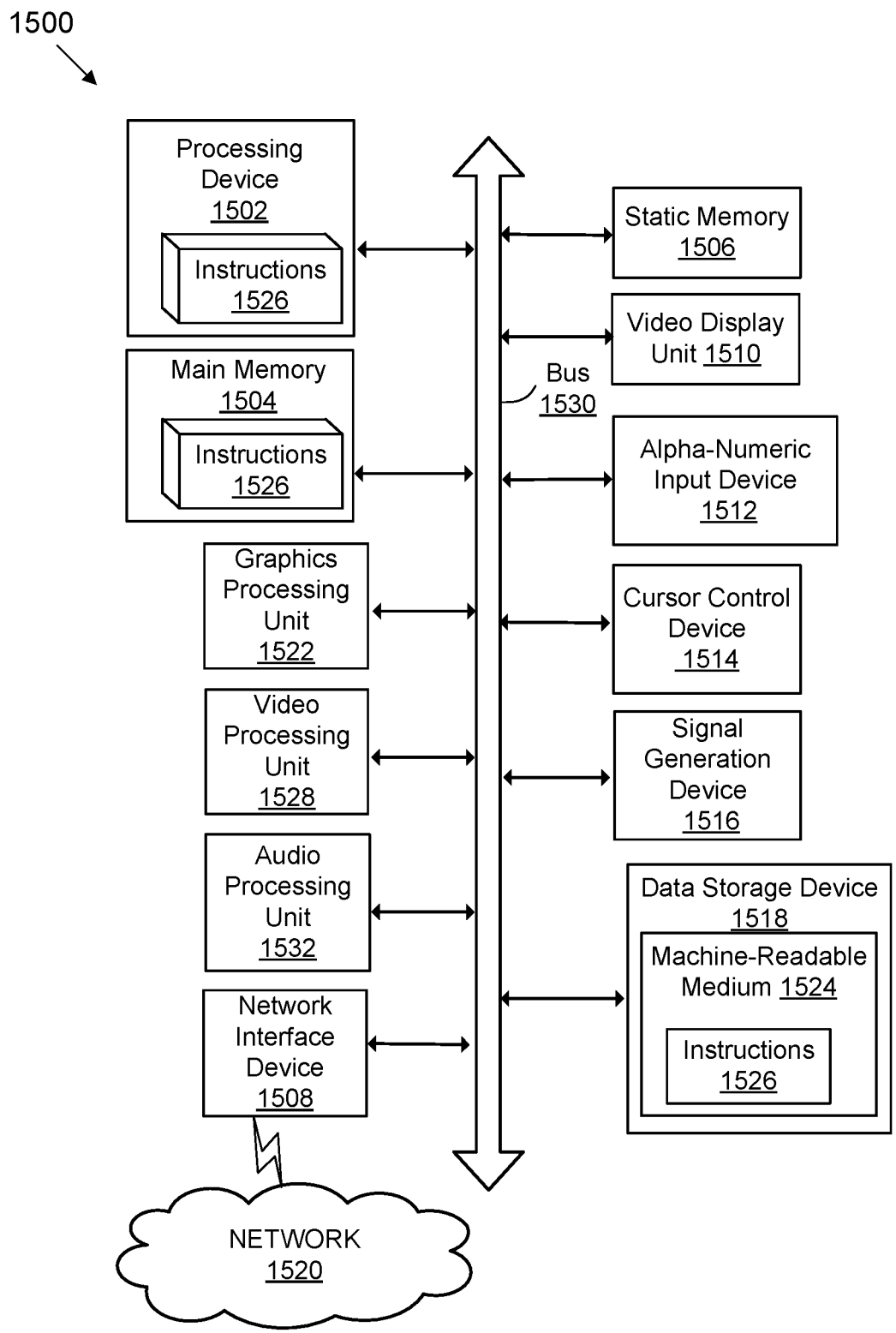
FIG. 15 depicts a diagram of an example computer system in which embodiments of the present disclosure may operate.

FIG. 15 illustrates an example machine of a computer system 1500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1500 includes a processing device 1502, a main memory 1504 (e.g., read-only memory (ROM), flash memory, dynamic random access memory (DRAM) such as synchronous DRAM (SDRAM), a static memory 1506 (e.g., flash memory, static random access memory (SRAM), etc.), and a data storage device 1518, which communicate with each other via a bus 1530.

Processing device 1502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. The processing device 1502 may be configured to execute instructions 1526 for performing the operations and steps described herein.

The computer system 1500 may further include a network interface device 1508 to communicate over the network 1520. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), a graphics processing unit 1522, a signal generation device 1516 (e.g., a speaker), graphics processing unit 1522, video processing unit 1528, and audio processing unit 1532.

The data storage device 1518 may include a machine-readable storage medium 1524 (also known as a non-transitory computer-readable medium) on which is stored one or more sets of instructions 1526 or software embodying any one or more of the methodologies or functions described herein. The instructions 1526 may also reside, completely or at least partially, within the main memory 1504 and/or within the processing device 1502 during execution thereof by the computer system 1500, the main memory 1504 and the processing device 1502 also constituting machine-readable storage media.

In some implementations, the instructions 1526 include instructions to implement functionality corresponding to the present disclosure. While the machine-readable storage medium 1524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    performing a lookahead scan of a file of a circuit design to parse an iterative loop and extract information indicating one or more design objects and one or more design attributes associated with a query in the iterative loop;
    performing, by one or more processors, an action to retrieve attribute information associated with the one or more design attributes from one or more partitions of the circuit design before executing the iterative loop, wherein the action comprises transmitting, to one or more distributed processors, a cache command requesting the attribute information to be sent from the one or more distributed processors to a storage system;
    receiving an acknowledgement from the one or more distributed processors that the attribute information is stored in the storage system; and
    executing the iterative loop using the attribute information stored in the storage system based on the acknowledgement.

2. The method of claim 1, wherein performing the action comprises:
    establishing the storage system that sequentially stores the attribute information to minimize a number of fetch operations during execution of the iterative loop; and
    storing the attribute information in the storage system.

3. The method of claim 1, wherein executing the query comprises: determining whether the information is stored in a primary machine;
    forming a key based on a chunk number when the information is not stored in the primary machine;
    retrieving the attribute information associated with the chunk number from the storage system using the key; and
    storing the retrieved attribute information in the primary machine.

4. The method of claim 3, wherein forming the key is further based on a partition number and a number of the query.

5. The method of claim 3, further comprising:
    deleting the attribute information associated with a previous chunk number stored in the primary machine before retrieving the attribute information associated with the chunk number.

6. The method of claim 1, wherein the file comprises the iterative loop; and performing the lookahead scan comprises:
    identifying the one or more design objects associated with the query based on the information.

7. The method of claim 1, wherein performing the lookahead scan further comprises:
    forming a formation graph that represents a relationship between a design attribute of the one or more design attributes and the one or more design objects;
    performing a forward traversal of the formation graph from a design object of the one or more design objects for a command; and
    performing a reverse traversal of the formation graph from the design attribute, wherein the design attribute is used by the command.

8. The method of claim 1, wherein the query extracts attributes associated with timing data of the circuit design and wherein the timing data are obtained using distributed static timing analysis (DSTA) performed by one or more processors.

9. The method of claim 1, wherein each processor of the one or more distributed processors determines an attribute value and sends the attribute value to the storage system, and wherein performing the action further comprises:
    querying the storage system to retrieve the attribute value.

10. A system comprising:
a memory storing instructions; and
a processor, coupled with the memory and to execute the instructions, the instructions when executed cause the processor to:
perform a lookahead scan of a file of a circuit design to parse an iterative loop and extract information indicating one or more design objects and one or more design attributes associated with a query in the iterative loop,
perform an action to retrieve attribute information associated with the one or more design attributes from one or more partitions of the circuit design before executing the iterative loop, wherein the action comprises transmitting, to one or more distributed processors, a cache command requesting the attribute information to be sent from the one or more distributed processors to a storage system,
receive an acknowledgement from the one or more distributed processors that the attribute information is stored in the storage system, and
execute the iterative loop using the attribute information stored in the storage system based on the acknowledgement.

11. The system of claim 10, wherein the processor is further configured to:
establish the storage system that sequentially stores the attribute information to minimize a number of fetch operations during execution of the iterative loop; and
store the attribute information in the storage system.

12. The system of claim 10, wherein the processor is further configured to:
determine whether the information are stored in a primary machine;
form a key based on a chunk number when the information are not stored in the primary machine;
retrieve the attribute information associated with the chunk number from the storage system using the key; and
store the retrieved attribute information in the primary machine.

13. The system of claim 12, wherein forming the key is further based on a partition number and a number of the query.

14. The system of claim 12, wherein the processor is further configured to:
delete the attribute information associated with a previous chunk number stored in the primary machine before retrieving the attribute information associated with the chunk number.

15. The system of claim 10, wherein the file comprises the iterative loop; and the processor is further configured to:
identify the one or more design objects associated with the query based on the information.

16. The system of claim 10, wherein the processor is further configured to:
form a formation graph that represents a relationship between a design attribute of the one or more design attributes and the one or more design objects;
perform a forward traversal of the formation graph from a design object of the one or more design objects for a command; and
perform a reverse traversal of the formation graph from the design attribute, wherein the design attribute is used by the command.

17. The system of claim 10, wherein each processor of the one or more distributed processors determines an attribute value and sends the attribute value to the storage system, and wherein the processor is further configured to:
query the storage system to retrieve the attribute value.

18. A non-transitory computer readable medium comprising stored instructions, which when executed by a processor, cause the processor to:
perform a lookahead scan of a file of a circuit design to parse an iterative loop and extract information indicating one or more design objects and one or more design attributes associated with a query in the iterative loop;
perform an action to retrieve attribute information associated with the one or more design attributes from one or more partitions of the circuit design before executing the iterative loop, wherein the action comprises transmitting, to one or more distributed processors, a cache command requesting the attribute information to be sent from the one or more distributed processors to a storage system;
receive an acknowledgement from the one or more distributed processors that the attribute information is stored in the storage system; and
execute the iterative loop using the attribute information stored in the storage system based on the acknowledgement.

19. The non-transitory computer readable medium of claim 18, wherein the processor is further configured to:
establish the storage system that minimizes a number of fetch operations during execution of the iterative loop; and
store the attribute information in the storage system.

20. The non-transitory computer readable medium of claim 18, wherein the processor is further configured to:
determine whether the information are stored in a primary machine;
form a key based on a chunk number when the information are not stored in the primary machine;
retrieve the attribute information associated with the chunk number from the storage system using the key; and
store the retrieved attribute information in the primary machine.

* * * * *